United States Patent
Li et al.

(10) Patent No.: US 8,107,424 B2
(45) Date of Patent: Jan. 31, 2012

(54) METHOD FOR AN RANDOM ACCESSES IN A LOCAL NETWORK

(75) Inventors: Hui Li, Beijing (CN); Harianto Wijaya, Jarkarta (ID); Wolfgang Zirwas, Gröbenzell (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 988 days.

(21) Appl. No.: 10/556,779

(22) PCT Filed: Apr. 1, 2004

(86) PCT No.: PCT/EP2004/050410
§ 371 (c)(1),
(2), (4) Date: Nov. 14, 2005

(87) PCT Pub. No.: WO2004/100462
PCT Pub. Date: Nov. 18, 2004

(65) Prior Publication Data
US 2006/0285516 A1    Dec. 21, 2006

(30) Foreign Application Priority Data
May 12, 2003   (EP) ..................... 03010625

(51) Int. Cl.
*H04W 4/00* (2009.01)
(52) U.S. Cl. ........ 370/329; 370/315; 370/226; 370/243; 370/279; 455/450; 455/451; 455/11.1
(58) Field of Classification Search ................ 370/226, 370/243, 246, 279, 293, 492, 315, 501, 329, 370/338; 455/11.1, 11.2, 7, 13.1
See application file for complete search history.

(56) References Cited

U.S. PATENT DOCUMENTS

| | | | |
|---|---|---|---|
| 6,865,165 B1 * | 3/2005 | Huttunen | 370/329 |
| 2001/0036810 A1 * | 11/2001 | Larsen | 455/11.1 |
| 2002/0089957 A1 | 7/2002 | Viero | |
| 2005/0041670 A1 * | 2/2005 | Lin et al. | 370/395.21 |

FOREIGN PATENT DOCUMENTS

| | | |
|---|---|---|
| EP | 1 271 852 A2 | 1/2003 |
| WO | 01/69869 A2 | 9/2001 |
| WO | 03/005643 A1 | 1/2003 |
| WO | 03/026221 A1 | 3/2003 |

OTHER PUBLICATIONS

International Search Report for International Application No. PCT/EP2004/050410; mailed Jul. 27, 2004.
Part 11: Wireless LAN Medium Access Control (MAC) and Physical Layer (PHY) Specifications; ANSI/IEEE Std. 802.11, 1999 Edition; pp. 1-512.

* cited by examiner

*Primary Examiner* — Kamran Afshar
*Assistant Examiner* — Dung Lam
(74) *Attorney, Agent, or Firm* — Staas & Halsey LLP

(57) ABSTRACT

Random accesses are regulated in a radio-assisted local network having at least one access point, a reachable radio station located in the radio coverage area of the at least one access point, at least one remote radio station located outside the radio coverage area of the at least one access point and inside the radio coverage area of the reachable radio station. The at least one access point temporarily allocates radio resources, for sending information, to radio stations inside the radio coverage area. The reachable radio station sends a signal to the at least one remote radio station, containing information on the permissibility of random access by the at least one remote radio station to the radio resources of the at least one access point.

18 Claims, 10 Drawing Sheets

FIG 9

MAC-FRAME

| FRAME CONTROL | 2 |
|---|---|
| DURATION ID | 2 |
| ADDRESS 1 | 6 |
| ADDRESS 2 | 6 |
| ADDRESS 3 | 6 |
| SEQUENCE CONTROL | 2 |
| ADDRESS 4 | 6 |
| QoS CONTROL | 2 |
| DATA | 0 |
| CRC | 4 |

FIG 10

DURATION ID

| | Bits 0-13 | Bit 14 | Bit 15 | Application |
|---|---|---|---|---|
| 1 | Bits 0-13 | Bit 14 | Bit 15 | Application |
| 2 | 0-32767 | | 0 | Engaged |
| 3 | 0 | 0 | 1 | Engaged |
| 4 | 1-16383 | 0 | 1 | W-PHASE |
| 5 | 0 | 1 | 1 | Reserved |
| 6 | 1-2007 | 1 | 1 | Engaged |
| 7 | 2008-16383 | 1 | 1 | Reserved |

METHOD FOR AN RANDOM ACCESSES IN A LOCAL NETWORK

CROSS REFERENCE TO RELATED APPLICATIONS

This application is based on and hereby claims priority to European Application No. 03010325.6 filed on May 12, 2003, the contents of which are hereby incorporated by reference.

BACKGROUND OF THE INVENTION

1. Field of the Invention

The invention relates to a method for regulating random accesses in a radio-assisted local network.

2. Description of the Related Art

As a rule, local networks (LANs, Local Area Networks) mean communication networks that can be extended by some 10 meters up to 10 kilometers. Radio-assisted local networks are designated as WLANs (Wireless LANs). However, the plurality of LANs only stretches over a few hundred meters inside buildings or an organization (in-house networks).

WLANs allow communication between a wired network infrastructure and mobile computers or other stations on the subscriber-side. Frequently WLANs are used as a supplement for cable-supported LANs in specific work environments. As a rule, WLANs include access points (Access Points, APs) which are connected with one another via a wire-assisted LAN and in the case of which the data transport takes place from a mobile transmitter via a radio link to the AP and is then forwarded via the LAN. The cells covered by the WLANs are with a diameter of up to a few hundred meters compared with the customary mobile radio cells so small that they are called microcells.

Examples of different standards for WLANs are Hiper-LAN, DECT, IEEE 802.11, Bluetooth and WATM. However, at present it seems that, as local radio-assisted networks particularly in the USA and Europe, almost exclusively those products based on the IEEE 802.11 family, have gained acceptance, in which case corresponding Ethernet connections have already been provided in many computers and portable computers (e.g. laptop, notebook, PDA) as standard practice. The radio interface defined in accordance with the IEEE 802.11b standard for accessing local networks corresponds functionally to a connection wired to local networks (LANs), which these days have developed into a standard in offices. As a rule, interface cards for radio-assisted accesses to local networks, which are also designated as NICs (Network Interface Cards), are made, from an architectural point of view, in the same way as standardized Ethernet cards and in view of our present operating systems be used per so-called plug & play. Portable computers can be retrofitted with corresponding interface cards without any problems, provided they have not already been delivered ex works with an integrated connection for a wired or a radio-assisted access to local networks. In the case of the next operating system generations (e.g. Windows XP from Microsoft), a fully integrated support of local radio networks (WLANs) is provided.

In general, the unlicensed frequency range around 2.4 GHz is used for radio-assisted WLANs. Data transmission rates are up to 11 Mbit/s. Future WLANs can be operated in the 5 GHz range and reach data rates exceeding 50 Mbit/s. With data rates of 11 Mbit/s at present and 50 Mbit/s in future, data rates are as a result made available to users of the WLANs, which are considerably higher than those data rates, which can be offered by the next, third mobile radio generation (e.g. UMTS). Therefore, for the transmission of large amounts of data, particularly in connection with Internet accesses, preference has to be given to the access to radio-assisted local networks (WLANs) for high-bit rate connections.

The standard for radio-assisted local networks IEEE 802.11 proposed in 1999 supports both the allocation of radio resources to radio stations for sending information with competition and an allocation without competition. The allocation of radio resources without competition is also used in cellular WCDMA systems. For this purpose, document US 2002/0089957 A1 describes a method in which the base station informs the mobile station at which times they may send a code to the random access channel in order to be able to compete for the allocation of radio resources by means of the base station. The allocation of radio resources without competition means that an access point allocates radio resources to radio stations, while in the case of an allocation with competition the radio stations operate a random access to the radio resources. However, within the framework of this standard, the different enquiries about resources for sending information, irrespective of the type of application being dealt with in this case are discussed here. In this way, the IEEE 802.11 standard is not in the position to guarantee a quality of service (QoS, Quality of Service). In order to remedy this shortcoming amongst others, a further development of the layer of the medium access control (MAC layer, Medium Access Control) is proposed within the framework of the future IEEE 802.11e standard. Document WO 03/026221 A1 explains the medium access methods according to IEEE 802.11. A few main features of the future IEEE 802.11e standard are described below:

The time interval between the beacon signals of the access points is fixed. A radio station is in this way no longer in the position to force the access point to a delayed sending of the beacon signal.

Data of a traffic category (Traffic Category, TC) mean the data of the MAC layer with a specific priority.

An access point can allocate radio resources to a radio station. This process is known as "polling". In addition, a radio station can send information, in which the EDCF (Enhanced Distributed Coordination Function) is used, per random access. This is based on the CSMA (Carrier Sense Multiple Access) method, in which case an attempt is made to avoid the collisions of radio signals by using a backoff mechanism. In this case, a radio station determines, by measurements, whether or not the medium, i.e. the radio resource, is engaged. If an engagement of the medium has to be approved, a backoff time is calculated according to which a random access to the radio resources is started. Parameters of the traffic category are also included in this calculation.

The access point controls the maximum time interval (Transmission Opportunity) to be used for a random access in the EDCF mode. Each station in the radio coverage area of the access point can take this value from the beacon signal sent periodically from the access point.

In the time phases without competition (competition-free), the access point can be allocated to the radio stations by polling time intervals of different lengths for sending information.

The radio stations, which prioritize the information to be sent by you according to the TC, are called Quality of Service Stations (Quality of Service Stations, QSTA). In addition to these, there can also be radio stations in the radio-assisted local network, which do not carry out such a prioritizing.

An access point, which carries out the allocation of radio resources to the Quality of Service Stations and to other stations, as well as the regulation with regard to the allocation of radio resources in the competition, is called the Hybrid Coordinator, HC. Each Quality of Service Station has the capacities needed to carry out these tasks.

The term transmission opportunity, TXOP, on the one hand, designates the maximum time interval to be used for a random access during the competition phase in the EDCF mode. This means that should the medium be available in accordance with the regulations of the EDCF for a radio station, the radio station can use the TXOP for sending information. On the other hand, the TXOP also designates that time interval, which is made available to a radio station for sending information after radio resources have been allocated to this radio station from an access point. With a view to the competition phase, the length of the TXOP is transmitted in the beacon signal of the access point and with a view to the phase without competition, the signal, which indicates the allocating of radio resources to a radio station, contains information about the length of the TXOP in question.

The radio coverage area of a WLAN is typically between 50 and 200 meters. If a radio station remains farther away from an access point, i.e. located outside the radio coverage area of the access point, the radio station is a remote radio station, with which no direct radio contact to the access point is possible. In order to extend the radio coverage area of a WLAN, it is possible because of this to bridge the radio signal between remote station and an access point by stations, which are at the same time located in the radio coverage areas of the access point and the remote station. Such multi-hop concepts increase the economic efficiency of WLANs, because in this case, the expensive infrastructure of a WLAN can be used more efficiently.

However, including remote radio stations in the WLANs indeed also brings along a series of problems. There is for instance the danger that remote stations on the basis of random accesses thereof, generate undesired interfering signals to the signals of other radio stations, such as for example to the important beacon signals. Such effects have to be avoided. On the other hand, a random access in view of a good utilization of the scarce radio resources should be made possible for the remote stations as often as possible. A suitable switching between rejecting and granting a random access has proved to be particularly advantageous.

SUMMARY OF THE INVENTION

Therefore, an object of the invention is to define an efficient method of the aforementioned type for regulating random accesses in a radio-assisted local network if remote radio stations are available.

In the radio-assisted local network, at least one access point temporarily allocates radio resources for sending information to radio stations inside the radio coverage area thereof, and radio stations temporarily operate a random access to radio resources for sending information. According to the invention, a first or reachable radio station sends a signal to at least one remote radio station, containing information about the permissibility of a random access of at least one remote radio station. For this purpose, a random access represents an access to the radio resources for sending information without allocating radio resources. The signal rejects a random access of at least one remote radio station.

If radio resources are allocated to a radio station, or should it be possible for the radio station to gain radio resources for itself by a successful random access, then the radio station can allocate radio resources to remote radio stations inside the radio coverage area thereof. The radio station can also allow its remote radio stations to operate random accesses to radio resources. Advantageously, information about the permissibility of a random access of remote radio stations is provided at the start and/or at the end of such a time interval for which radio resources were allocated to your radio station or could be gained per random access.

The method according to the invention allows a flexible handling of the random access rights from remote radio stations in a radio-assisted local network. The rejection of a random access can reduce undesired collisions of signals or interferences and by granting a random access, the scarce radio resources are used more efficiently.

In an embodiment of the invention, the signal rejects a random access of at least one remote radio station. The signal can reject a random access of at least one remote radio station for a specific time interval in particular. The rejection of a random access restricted in time or even not restricted in time prevents the relevant remote radio stations from attempting to carry out a random access. As a result of this, the remote radio stations "have been forced to silence", namely, radio resources are allocated to them or the rejection is lifted, or the time interval of the rejection expires.

In further developments of the invention, the signal includes an allocation of radio resources to a station other than the—at least one—remote radio station, in particular to the first radio station. An allocation of radio resources to one radio station prevents other radio stations from carrying out random accesses in this time interval. Therefore, the first radio station, for example, can allocate radio resources to itself or to any radio station with the exception of its remote radio stations in order to be able to reject a random access in its remote radio stations. This signal of allocating radio resources in reality does not mean a real allocation of radio resources because the first radio station compared to other radio stations with the exception of its remote radio stations, is as a rule not authorized to allocate radio resources. This signal is only a "dummy signal", which includes the rejection of a random access for the relevant remote radio stations.

In another further development of the invention, the signal indicates a being available of radio resources for a station other than the—at least one—remote radio station, in particular to the first radio station, after a successful random access. A successful random access of a radio station prevents other radio stations from carrying out random accesses in the time interval made available for the successful random access. The first radio station pretends on the basis of the signal that it or any other radio station with the exception of its remote radio stations has carried out a successful random access in order to be able to reject a random access in its remote radio stations. This signal is also only a "dummy signal". The signal can, for example, indicate a sending of information to a station other than the—at least one—remote station, in particular to a first radio station. The first radio station can therefore pretend that it would like to send information to itself after a successful random access has been implemented.

In another further development of the invention, the signal includes after all a stipulation that the maximum time interval to be used for a random access has to be zero. In this case, the maximum time interval to be used for a random access means the value of the time interval, which is made available to a radio station for communication if the radio station has successfully carried out a random access. The time interval used for the random access signal can either be included or not included in this time interval. Advantageously, the signal is a beacon signal. It can also be a signal similar to a beacon signal provided that it is the task of both the signal and the beacon signal, etc., to stipulate the value of the maximum time interval to be used for a random access. After such a signal, the relevant remote stations have no more time available for implementing a random access.

According to an advantageous embodiment of the invention, the additional signal enables a random access of at least one remote radio station. It is often meaningful to use such a signal for granting a random access, after a rejection, not restricted in time, has taken place, or a rejection restricted in time has to be lifted before the specific time interval expires. In these cases, the method according to the invention is also used in different embodiments in this way. The nature of the granting signal adapts itself to the nature of the rejecting signal in a favorable manner.

In a further development of the invention, the additional signal indicates the end of an engagement of radio resources. The remote radio stations recognize in this signal that the rejection of the random access is no longer valid on the basis of the fact that radio resources, because of the allocation of radio resources to other radio stations or because of a successful random access, are engaged by other radio stations and that a random access is therefore allowed until further notice.

In another further development of the invention, the additional signal includes a stipulation-that the maximum time interval to be used for a random access has to exceed zero. This nature of a granting signal is in particular suitable after a rejecting signal, which has brought about a stipulation that the maximum time interval to be used for a random access has to be zero. Advantageously, the value of the time interval to be used for a random access depends on the number of remote radio stations located outside the radio coverage area of at least one access point and at the same time inside the radio coverage area of the first radio station. This enables an efficient distribution of radio resources by using the random access method. The additional signal can in particular be a beacon signal or a signal similar to a beacon signal.

According to an embodiment of the invention, the additional signal includes information about a time interval, which can be used by all the radio stations of the radio-assisted local network for a random access to the radio resources. This time interval is therefore made available to the radio stations inside the radio coverage area of the access point and the remote radio stations located outside the radio coverage area of the access point for random accesses. Such a time interval in particular positively influences the utilization of radio resources. Consequently, the additional signal indicates a time interval, which could reliably be used by the remote radio stations for random accesses. It is possible that this is both the only time interval for the random accesses of the remote radio stations and that one or a plurality of additional time intervals can exist for random accesses for all or some remote radio stations. A corresponding signal indicating a time interval for a common random access is also transmitted from the access point to the radio stations inside the radio coverage area of the access point.

Advantageously, the information is the length of the time interval, which can be used by all the radio stations of the radio-assisted local network for a random access to the radio resources and/or the starting point of this time interval. The mere transmission of the length of the time interval is only possible, if the starting point can be determined by the remote stations in another way. The sole transmission of a starting point is advantageous together with a signal, which optionally indicates the end of the time interval at a later point in time.

In a further development of the invention, with the exception of the time interval, only at least one access point allocates radio resources to radio stations inside the radio coverage area thereof. Therefore, a random access by radio stations inside the radio coverage area of the access point is not granted outside the time interval for a common random access. The access point only distributes the radio resources in a central manner during these periods in time. In principle, a random access of remote radio stations is also rejected. However, if radio resources are allocated to a radio station, then this station is free to grant its remote radio stations random accesses to radio resources during the time interval, which is available to it. This procedure avoids undesired collisions of random access signals from remote radio stations with other signals located outside the time interval, which can be used by all the radio stations for a random access.

An embodiment of the invention, includes information about the duration ID field of an MAC frame. In this case, all the radio stations of the radio-assisted local network can read out the corresponding bits of the duration ID field in order to obtain the necessary information about the time interval for a common random access.

Advantageously, the additional signal can be a beacon signal or a signal for the allocation of radio resources or a signal, which indicates a being available of radio resources after a successful random access has been implemented.

Advantageously, the signal or also the additional signal is sent from the first radio station during a time interval in which radio resources of at least one access point have been allocated to the first radio station, or in which radio resources are made available to the first radio station after a successful random access has been implemented.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 9 is a data diagram of a MAC frame inside the IEEE 802.11e standard, FIG. 10 is a data diagram of a duration ID field of a MAC frame according to the invention.

DETAILED DESCRIPTION OF THE PREFERRED EMBODIMENT

Figure 1:
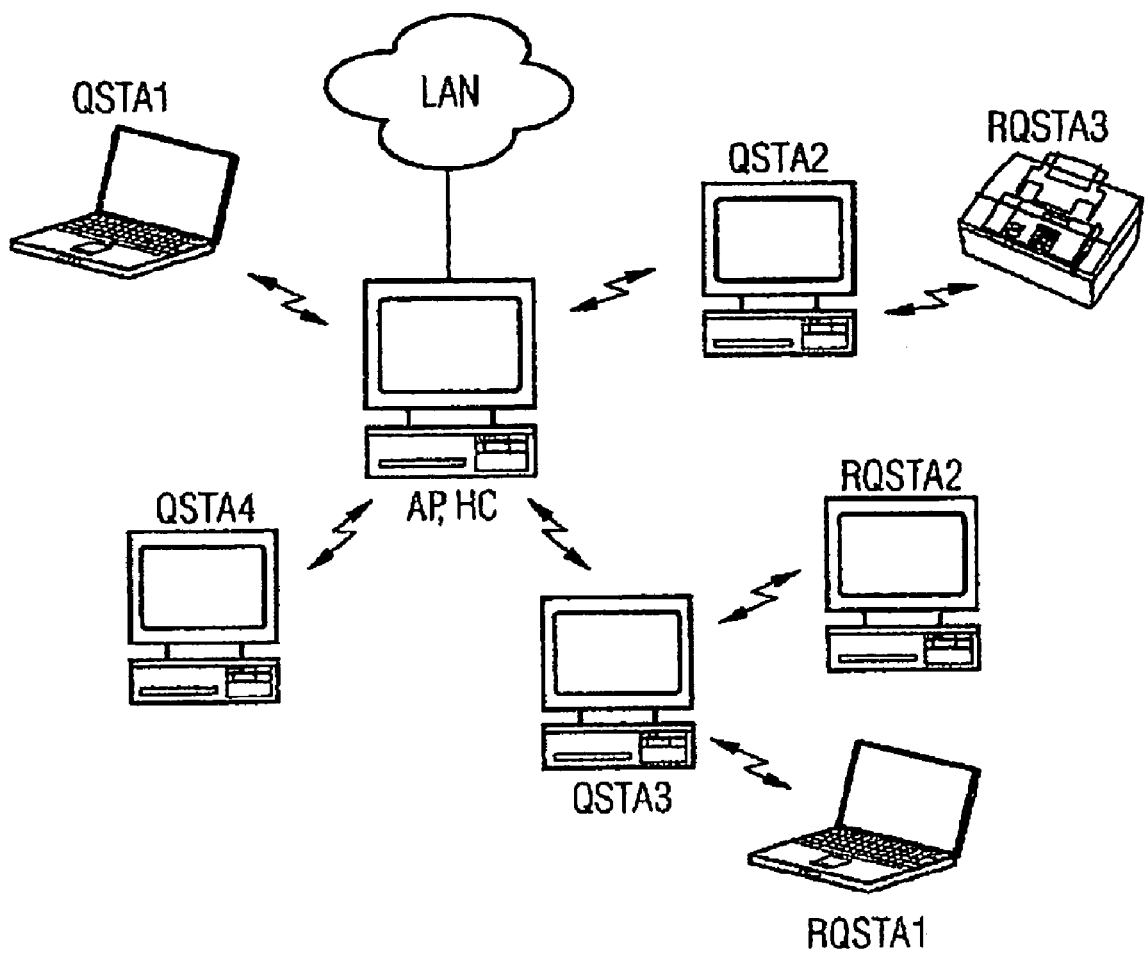
FIG. 1 is a block diagram of a radio-assisted local network.

Reference will now be made in detail to the preferred embodiments of the present invention, examples of which are illustrated in the accompanying drawings, wherein like reference numerals refer to like elements throughout.

The embodiment refers to a radio-assisted local network according to the type of the IEEE 802.11e standard. FIG. 1 shows a section from such a radio-assisted local network, using the Hybrid Coordinator HC, which is connected to the functionality of an access point AP. The radio access point AP is connected to the local network LAN. Four Quality of Service Stations QSTA1, QSTA2, QSTA3 and QSTA4 are located in the radio coverage area of the Hybrid Coordinator HC.

If both the Quality of Service Station QSTA3 and the Quality of Service Station QSTA4 intend to send data, with a delay which is as short as possible and with a high Traffic Category, the Hybrid Coordinator HC will allocate the radio resources to these radio stations according to the relevant values of the Traffic Category.

It is possible that the Hybrid Coordinator HC defines time intervals, while the Quality of Service Stations QSTA1, QSTA2, QSTA3 and QSTA4 carry out random accesses to the radio resources among one another in the competition in order to gain radio resources for itself for sending information. In the case of defined time intervals for competition phases, the access point can send a message, which indicates the end of the phase without competition. A second possibility as an alternative to defined competition phases is that random access to the Quality of Service Stations QSTA1, QSTA2, QSTA3 and QSTA4 is always granted, if no radio resources have at present been allocated by the Hybrid Coordinator HC to one of the Quality of Service Stations QSTA1, QSTA2, QSTA3 and QSTA4. In both cases, the Quality of Service Stations QSTA1, QSTA2, QSTA3 and QSTA4 operate random accesses to the radio resources in the relevant competition phases in order to send data with lower values to the Traffic Category.

Figure 2:
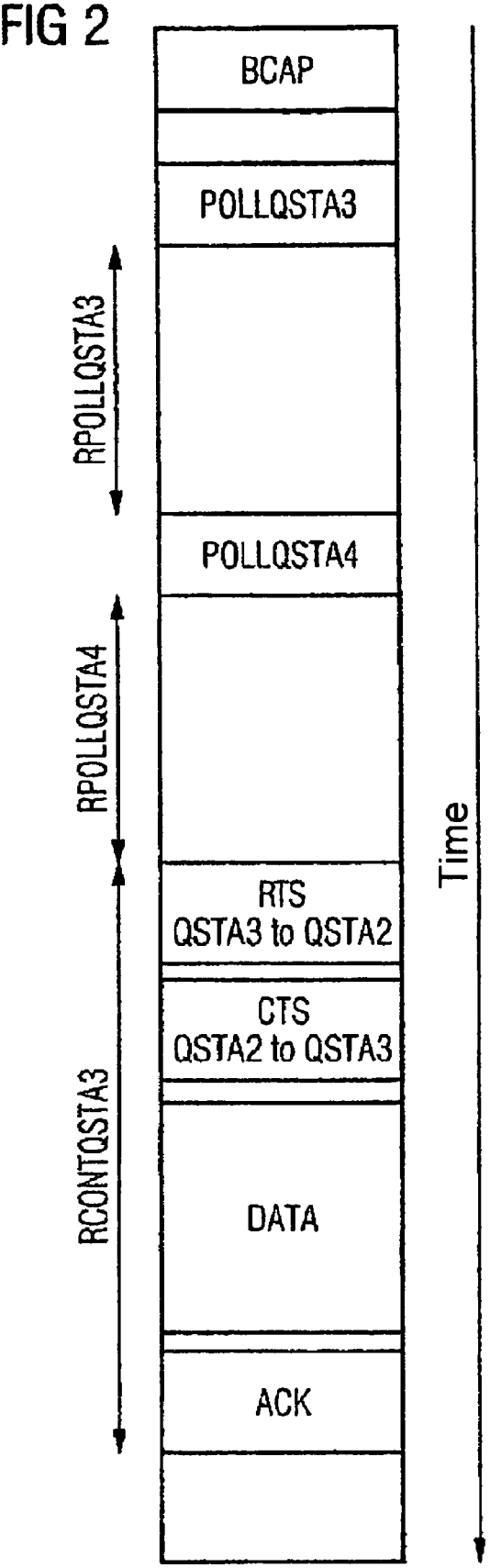
FIG. 2 is a data transmission diagram for an exemplary resource distribution.

FIG. 2 shows an exemplary distribution of radio resources. The time curve is plotted on the right. The Hybrid Coordinator HC or the access point AP initially sends a beacon signal BCAP (BeaCon Access Point). The beacon signal BCAP of the access point AP is used, amongst others, for the time synchronization, it contains the interval in time up to the next beacon signal (not shown), the length of the Transmission Opportunity for random access according to the EDCF method and the QoS parameter. In addition, the beacon signal makes it possible for the radio stations to locate the suitable access point. After sending the beacon signal, the Hybrid Coordinator HC allocates radio resources with a signal POLLQSTA3 to the Quality of Service Station QSTA 3. This signal POLLQSTA3 contains information about which time interval RPOLLQSTA3 the Quality of Service Station QSTA3 may use for sending information. Subsequent to the time interval RPOLLQSTA3, the Hybrid Coordinator HC allocates radio resources to the Quality of Service Station QSTA4 with a signal POLLQSTA4. This signal POLLQSTA4 contains information about which time interval RPOLLQSTA4 the Quality of Service Station QSTA4 may use for sending information. The two time intervals RPOLLQSTA3 and RPOLLQSTA4 can be of equal length or they can differ. These two time intervals in each case correspond to a Transmission Opportunity for the allocation of resources.

All the radio stations in the radio coverage area of the access point AP, i.e. the Quality of Service Stations QSTA1, QSTA2, QSTA3 and QSTA4 receive the signals POLLQSTA3 and POLLQSTA4. Because the signals POLLQSTA3 and POLLQSTA4 contain information about the time intervals RPOLLQSTA3 and RPOLLQSTA4, the radio stations to which no resources were allocated for the time interval for which a random access is rejected is known. If resources are allocated to the Quality of Service Station QSTA3, the radio stations regard the radio resource for the time interval RPOLLQSTA3 as reserved for the Quality of Service Station QSTA3 and, therefore, will not make an attempt during this period in time to gain resources for itself per random access. This reservation of radio resources takes place in the radio stations using the Network Allocation Vector (NAV), to which after receiving the signal POLLQSTA3, the value of the reserved time interval RPOLLQSTA3 is allocated. The assignment of radio resources by an allocation via the access point, on the one hand, and via the random access, on the other hand, therefore alternate in each case.

Subsequent to the time interval RPOLLQSTA4, the Quality of Service Stations QSTA1, QSTA2, QSTA3 and QSTA4 can operate a random access to the radio resources in the competition. In FIG. 2, the Quality of Service Station QSTA3 could be carried out successfully in the competition. Radio resources for the time interval RCONTQSTA3 are made available to the station. It sends a Ready to Send message RTS QSTA3 TO QSTA2 to the Quality of Service Station QSTA2, which indicates that it is ready to send information for the Quality of Service Station QSTA2. The Quality of Service Station QSTA2 answers with a Clear to Send message CTS QSTA2 TO QSTA3. As a result, the Quality of Service Station QSTA3 sends the information DATA, whereupon the Quality of Service Station QSTA2 answers with a reception acknowledgement ACK. The time interval RCONTQSTA3 corresponds to the Transmission Opportunity, which the Quality of Service Station QSTA3 could gain for itself in the competition. The length of the time interval RCONTQSTA3 was transmitted to the Quality of Service Stations QSTA1, QSTA2, QSTA3 and QSTA4 in the beacon signal BCAP sent from the Hybrid Coordinator HC.

FIG. 1 shows in addition to the Quality of Service Stations QSTA1, QSTA2, QSTA3 and QSTA4, three remote Quality of Service Stations RQSTA1, RQSTA2 and RQSTA3. These remote Quality of Service Stations RQSTA1, RQSTA2 and RQSTA3 are located outside the radio coverage area of the access point AP. The remote Quality of Service Stations RQSTA1 and RQSTA2 are located inside the radio coverage area of the Quality of Service Station QSTA3, while the remote Quality of Service Station RQSTA3 is at present located in the radio coverage area of the Quality of Service Station QSTA2. The radio coverage area of the radio-assisted local network should now be extended to the effect that the Quality of Service Stations QSTA2 and QSTA3 establish the radio connection between the relevant remote Quality of Service Stations RQSTA1, RQSTA2 and RQSTA3 inside its radio coverage area and the access point AP. Such Quality of Service Stations QSTA2 and QSTA3, which make possible Multi-Hop information transmission are also called wireless routers.

For this purpose, the two Quality of Service Stations QSTA2 and QSTA3 periodically send beacon signals to the Quality of Service Stations RQSTA1, RQSTA2 and RQSTA3 in its specific radio coverage area. The available Transmission Opportunity of a random access, is transmitted in the signals to the remote Quality of Service Stations RQSTA1, RQSTA2 and RQSTA3 so that these stations can gain radio resources in the competition in accordance with the EDCF method.

Figure 3:
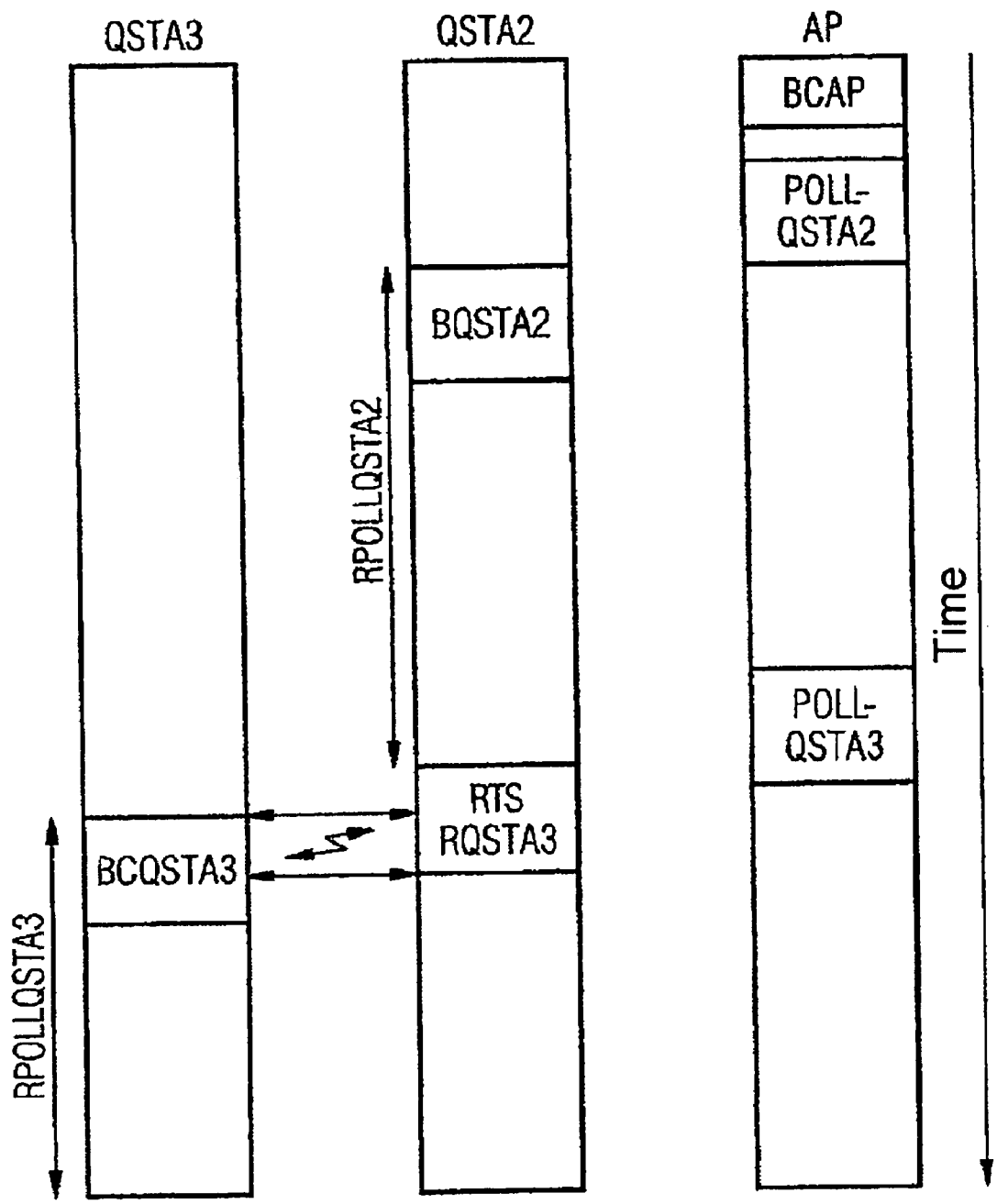
FIG. 3 is a data transmission diagram for an exemplary resource distribution if remote Quality of Service Stations are available.

FIG. 3 shows an example of the resource distribution if remote Quality of Service Stations RQSTA1, RQSTA2 and RQSTA3 are available. The time is plotted on the right. The top bar corresponds to the signals sent from the access point AP in the course of time, the middle bar signals sent from the Quality of Service Station QSTA2, and the bottom bar represents the signals sent from the Quality of Service Station QSTA3. The access point AP initially sends a beacon signal BCAP. As a result, the access point AP allocates resources to the Quality of Service Station QSTA2 by using the signal POLLQSTA2. The following time interval RPOLLQSTA2 is made available to the Quality of Service Station QSTA2. The station can send information to the access point AP or to the radio stations within the time interval RPOLLQSTA2. In addition, the Quality of Service Station QSTA2 can allocate resources to the remote Quality of Service Station RQSTA3 or the remote Quality of Service Station RQSTA3 can have a random access carried out within the time interval RPOLLQSTA2. For the competition phases for a random access of remote Quality of Service Stations, the corresponding embodiments are applicable with regard to the random access of Quality of Service Stations located inside the radio coverage area of the access point AP. At the start, the Quality of Service Station QSTA2 sends a beacon signal BCQSTA2, in which the remote Quality of Service Station RQSTA3 located inside its radio coverage area amongst others transmits the length of the Transmission Opportunity for the random access.

After the time interval RPOLLQSTA2 has expired, the access point AP assigns resources to the Quality of Service Station QSTA3 by using the signal POLLQSTA3. The following time interval RPOLLQSTA3 is made available to the Quality of Service Station QSTA3, which can be used by the time interval RPOLLQSTA3 for sending information. In addition, the Quality of Service Station QSTA3 can allocate radio resources to the remote Quality of Service Stations RQSTA1 and RQSTA2 inside its radio coverage area or have random accesses carried out to the radio resources in the competition during the time interval RPOLLQSTA3. At the start, the Quality of Service Station QSTA3 also sends a beacon signal BCQSTA3, in which the remote Quality of Service Stations RQSTA1 and RQSTA2 located inside its radio coverage area amongst others transmits the length of the Transmission Opportunity for the random access.

If for the remote Quality of Service Stations RQSTA1, RQSTA2 and RQSTA3 a defined time interval for the competition phase has not been stipulated, the stations can carry out random accesses in accordance with the EDCF method, if they determine that the radio medium is not engaged. FIG. 3 shows the case that the remote Quality of Service Station RQSTA3 sends a Ready to Send message RTS RQSTA3 in a random access. As can be seen in FIG. 3, this Ready to Send message RTS RQSTA3 of the remote Quality of Service Station RQSTA3 collides in time with the beacon signal BCQSTA3 of the Quality of Service Station QSTA3. As a rule, such a collision results in the fact that none of the signals arrive undamaged at a receiver. Such collisions of random access signals from remote Quality of Service Stations with the signals from Quality of Service Stations, in particular, with the beacon signals, represent an obstacle for communication inside radio-assisted local networks with remote Quality of Service Stations.

Figure 4:
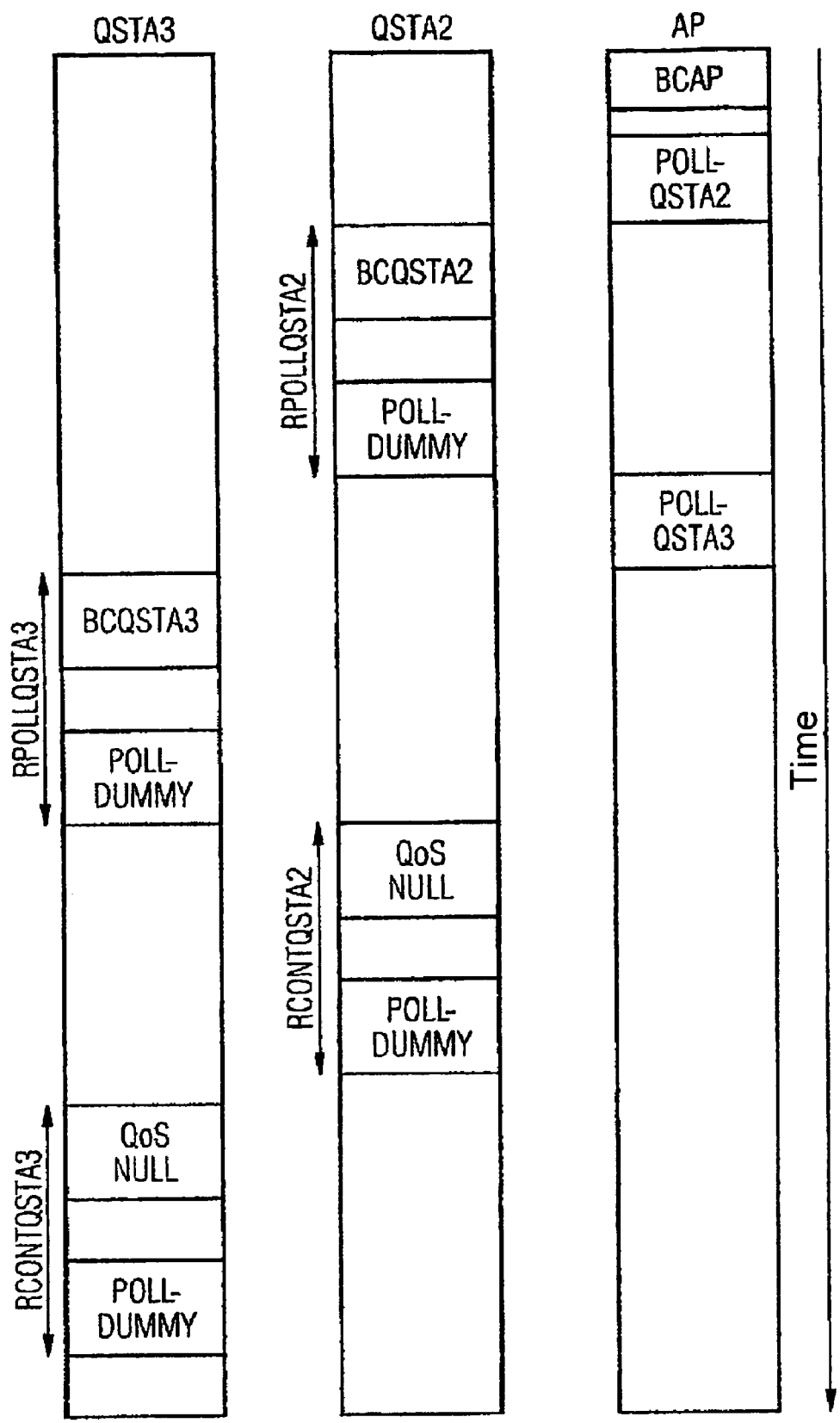
FIG. 4 is a data transmission diagram for a method according to the invention for the distribution of resources if remote Quality of Service Stations by using POLLDUMMY messages are available.

FIG. 4 shows a possibility according to the invention to inform the remote Quality of Service Stations that they in future may not operate any random access. For this purpose, the Quality of Service Station QSTA2 sends a signal POLLDUMMY at the end of the time interval RPOLLQSTA2, to which the signal POLLQSTA2 was allocated to it from the access point AP. With this signal, the Quality of Service Station QSTA2 allocates resources to a radio station, which is not located inside its radio coverage area. In this case, it can be a radio station, which is located outside the radio coverage area of the Quality of Service Station QSTA2 or a radio station, which does not exist inside the radio-assisted local network. An additional possibility is the allocation of radio resources to itself. Each of these signals POLLDUMMY results in the fact that the remote Quality of Service Station RQSTA3, considers the radio resource to be reserved for a time interval contained in the signal POLLDUMMY if required, and therefore does not carry out any random access. Therefore, the remote Quality of Service Station RQSTA3 sets its Network Allocation Vector at the value of the time interval transmitted to it with the signal POLLDUMMY if required.

Because the beacon signals located inside the IEEE 802.11e standard have to be sent at fixed intervals, the Quality of Service Station QSTA2 can calculate the length of the time interval in the signal POLLDUMMY from the time interval from the end of the time interval RPOLLQSTA2 up to the next beacon signal to be sent from the Quality of Service Station QSTA2. By this procedure, it is ensured that the remote Quality of Service Station RQSTA3 does not carry out any random access during the time interval RPOLLQSTA3, which in FIG. 4 is allocated to the Quality of Service Station QSTA3.

The signals BCQSTA3 and POLLDUMMY, which are sent from the Quality of Service Station QSTA3, correspond to those of the Quality of Service Station QSTA2. Needless to say, the content of the relevant signals may differ from that of the signals of the Quality of Service Station QSTA2.

The Quality of Service Station QSTA2 informs the remote Quality of Service Station RQSTA3 via its beacon signal BCQSTA2 of the length of the Transmission Opportunity for the random access. In this case, attention must be paid to the fact that this length may not exceed the time interval RPOLLQSTA2 minus the length of the signals BCQSTA2 and POLLDUMMY and possibly minus specific protection times. In this case, the PIFS (Point Coordination Function InterFrame Spacing) was for example used as the protection time.

FIG. 4 shows the case that the Quality of Service Station QSTA2 subsequent to the time interval RPOLLQSTA3 can gain radio resources for itself per random access. The corresponding time interval RCONTQSTA2, which is available, must be taken from the beacon signal BCAP of the access point AP. If the Quality of Service Station QSTA2 intends to use the resource gained in the competition for sending information about the remote Quality of Service Station RQSTA3, it can send a signal QoSNULL at the beginning of the period in time RCONTQSTA2. This signal indicates to the remote Quality of Service Station RQSTA3, that the radio resource is no longer engaged. When using the Network Allocation Vector, the signal QoSNULL resets the Network Allocation Vector to zero. The Quality of Service Station QSTA2 can allocate resources to the remote Quality of Service Station RQSTA3 within the time interval RCONTQSTA2 or allow these random accesses to be operated. To end the time interval RCONTQSTA2, the Quality of Service Station QSTA2 again send a signal POLLDUMMY in order to keep the remote Quality of Service Station RQSTA3 from operating a random access in future. The time intervals contained in the signal POLLDUMMY, for which a random access is rejected by the remote Quality of Service Station RQSTA3, can again be determined via the interval in time up to the next beacon signal BCQSTA2 to be sent from the Quality of Service Station QSTA2.

A corresponding application of the signal QoSNULL is also possible when the Quality of Service Station QSTA2 again allocates resources within the same beacon period in time of the access point AP.

FIG. 4 shows by way of example that the Quality of Service Station QSTA3 subsequent to the time interval RCONTQSTA2 can gain resources for itself per random access. The above-mentioned embodiments accordingly apply to the signals QoSNULL and POLLDUMMY sent from the Quality of Service Station QSTA3.

Figure 5:
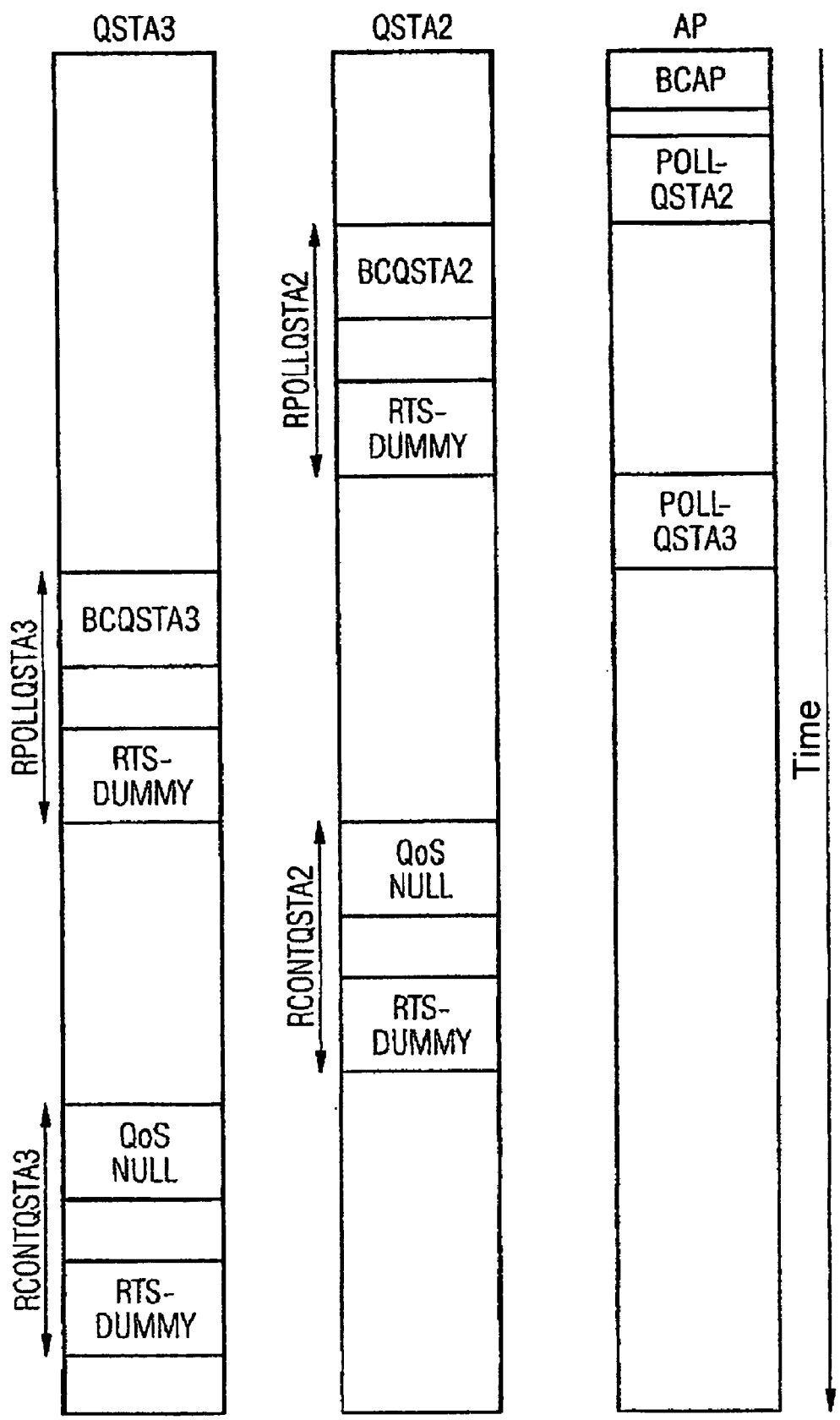
FIG. 5 is a data transmission diagram for a method according to the invention for the distribution of resources if remote Quality of Service Stations by using RTSDUMMY messages are available.

As an alternative for sending a signal POLLDUMMY via the Quality of Service Stations QSTA2 and QSTA3, the stations can also send a signal RTSDUMMY to the remote Quality of Service Stations RQSTA1, RQSTA2 and RQSTA3 inside its specific radio coverage area. This possibility is shown in FIG. 5. The signal RTSDUMMY includes a Ready to Send message to a radio station, which is not located inside the radio coverage area of the specific Quality of Service Station QSTA2 or QSTA3. In the same way as described when using POLLDUMMY messages, the addressee of the Ready to Send message RTSDUMMY can be a radio station, which is located outside the radio coverage area of the relevant Quality of Service Station QSTA2 or QSTA3, or also a radio station, which does not exist inside the radio-assisted local network. On the other hand, an additional possibility is the sending of the Ready to Send message RTSDUMMY to itself. If a Ready to Send message RTSDUMMY is sent, the remote Quality of Service Stations RQSTA1, RQSTA2 and RQSTA3 regard the radio medium as being engaged for the time interval of the Transmission Opportunity for random accesses, which was transmitted to them in the beacon signal of the specific Quality of Service Station QSTA2 or QSTA3.

Depending on the situation, the Quality of Service Stations QSTA2 and QSTA3 can decide whether or not a POLLDUMMY or a RTSDUMMY signal should be used in future for the rejection of a random access to the relevant remote Quality of Service Stations RQSTA1, RQSTA2 and RQSTA3.

An additional possibility of keeping the remote Quality of Service Stations RQSTA1, RQSTA2 and RQSTA3 from starting a random access, is a manipulation of the beacon signals of the relevant Quality of Service Stations QSTA2 and QSTA3. The beacon signals must be sent at regular intervals from the access point AP in accordance with the IEEE 802.11e standard, in which case the period in time of the beacon signals is known to the Quality of Service Stations. The interval between two beacon signals, i.e. the period in time of the beacon signals, is typically approximately 100 ms. The beacon signals of the Quality of Service Stations, which function as a bridge for remote Quality of Service Stations, should likewise be sent at regular intervals. However, the sending of an additional beacon signal (intermediate beacon) between two beacon signals does not contravene this principle. These intermediate beacon signals can be sent at any intervals. In the beacon signals, the Transmission Opportunity is transmitted to the Quality of Service Stations or the remote Quality of Service Stations, as the time interval which has been made available to you for communication in the case of a successful random access. Therefore, the length of the Transmission Opportunity is a fixed value until the next beacon signal is sent, whereby the value is again transmitted to the Transmission Opportunity for the following period in time of the beacon signal. Additional beacon signals also make it possible to change the value of the Transmission Opportunity within the period in time of the beacon signal.

Figure 6:
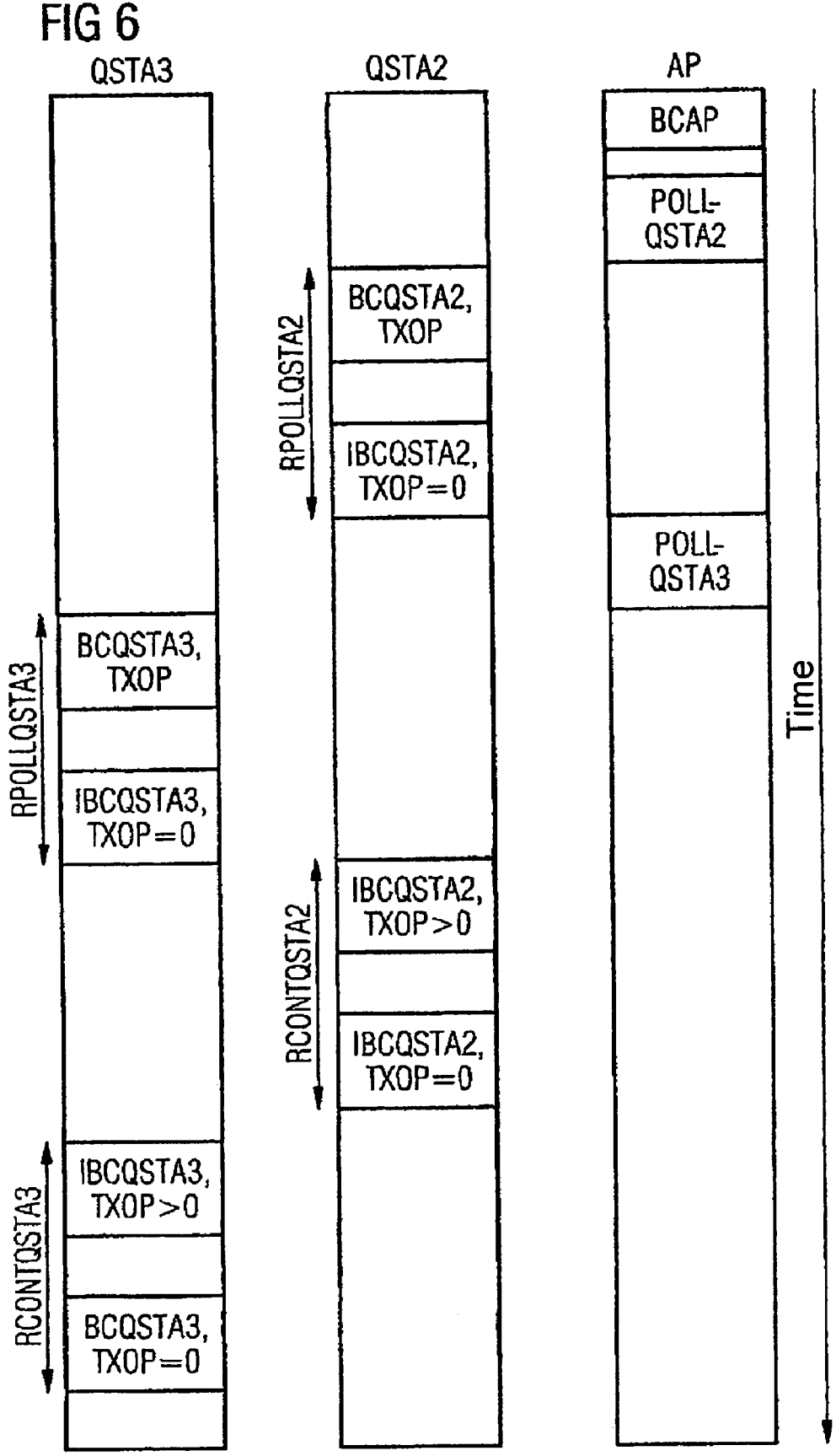
FIG. 6 is a data transmission diagram for a method according to the invention for the distribution of resources if remote Quality of Service Stations by using intermediate beacon signals are available.

FIG. 6 explains an exemplary procedure by using intermediate beacon signals. After resources for the time interval RPOLLQSTA2 were allocated to the Quality of Service Station QSTA2 from the access point AP with the signal POLLQSTA2, the Quality of Service Station QSTA2 sends a beacon signal BCQSTA2,TXOP, which determines the Transmission Opportunity for the remote Quality of Service Station RQSTA3 inside the radio coverage area thereof. At the end of the time interval RPOLLQSTA2, the Quality of Service Station QSTA2 sends an intermediate beacon signal BCQSTA2,TXOP=0, which allocates the value zero to the Transmission Opportunity. Consequently, the remote Quality of Service Station RQSTA3 will in future no longer have time available for random accesses.

The value of the Transmission Opportunity, which was transmitted to the remote Quality of Service Station RQSTA3 with the beacon signal BCQSTA2,TXOP, should be no longer than the time interval RPOLLQSTA2 minus the length of the beacon signal BCQSTA2,TXOP and the length of the intermediate beacon signal BCQSTA2,TXOP=0, as well as possible protection times. This applies when the Quality of Service Station QSTA2 within the time interval RPOLLQSTA2 of the remote Quality of Service Station RQSTA3 would like to carry out a random access. As a rule, the lengths of the intermediate beacon signals correspond to those of the beacon signals.

The corresponding method of using an intermediate beacon signal has to be used analogously to the Quality of Service Station QSTA3 within the time interval RPOLLQSTA3 allocated to it from the access point AP with the signal POLLQSTA3 as shown in FIG. 6.

In FIG. 6, the Quality of Service Station QSTA2 can gain radio resources for itself for the time interval RCONTQSTA2 in a random access after the time interval RPOLLQSTA3 has expired. With the intermediate beacon signal BCQSTA2, TXOP>0, the remote Quality of Service Station RQSTA3 transmits a positive, non-fading value for the Transmission Opportunity. Consequently, the remote Quality of Service Station RQSTA3 can in future again implement a random access. At the end of the time interval RCONTQSTA2, the Quality of Service Station QSTA2 again sends an intermediate beacon signal BCQSTA2,TXOP=0, which by setting to zero the Transmission Opportunity of the remote Quality of Service Station RQSTA3, makes a future implementation of a random access impossible. This applies up to the next sending of a possible intermediate beacon signal should radio resources from the access point AP again be allocated to the Quality of Service Station QSTA2 or should it be possible that the Quality of Service Station QSTA2 can again gain radio resources for itself in the competition. If no intermediate beacon signal is sent from the Quality of Service Station QSTA2, the setting to zero of the Transmission Opportunity applies up and until the next beacon signal of the Quality of Service Station QSTA2. In order to calculate the length of the Transmission Opportunity, which is transmitted with the intermediate beacon signal BCQSTA2,TXOP>0, the length of the Transmission Opportunity of the beacon signal BCQSTA2,TXOP applies in accordance with the embodiment.

In FIG. 6, the Quality of Service Station QSTA3, subsequent to the time interval RCONTQSTA2, can gain radio resources for itself for the time interval RCONTQSTA3 per successful random access. The Quality of Service Station QSTA3 applies the method with regard to the intermediate beacon signals BCQSTA3,TXOP>0 and BCQSTA3, TXOP=0 in accordance with the embodiments.

Figure 7:
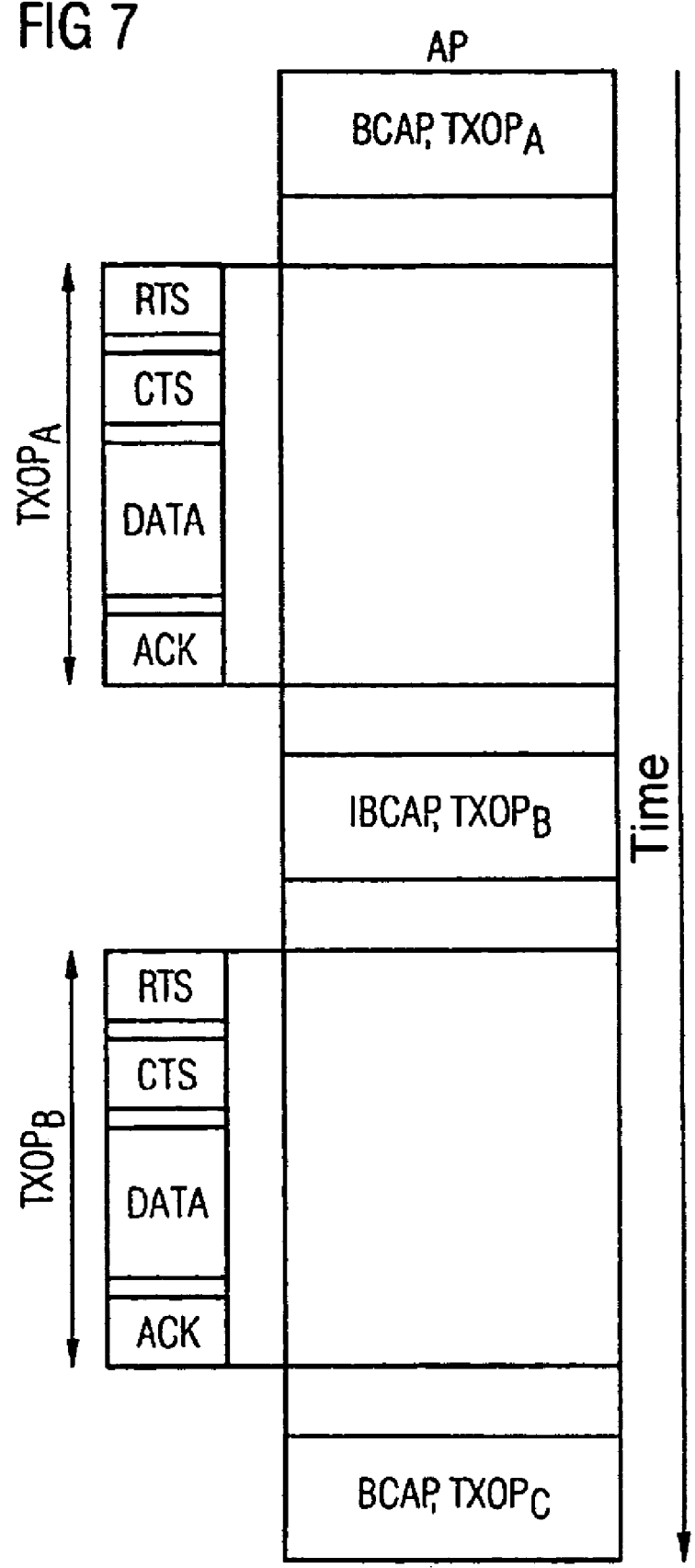
FIG. 7 is a data transmission diagram for an application according to the invention for intermediate beacon signals.

Intermediate beacon signals also serve the effective managing of radio resources via an access point or by radio stations which establish the radio connection between remote radio stations and an access point. FIG. 7 explains such a procedure on the basis of the signals sent from the access point AP. At the start, the latter sends a beacon signal BCAP, TXOPA, in which it transmits a value TXOPA for the Transmission Opportunity of the random access to the Quality of Service Stations inside the radio coverage area thereof. Subsequently, one of the Quality of Service Stations communicates after a successful random access with another Quality of Service Station inside the radio coverage area of the access point AP. In this case, the signals RTS, CTS, DATA and ACK are used by adhering to the maximum, available time interval of TXOPA. As a result, the access point AP sends an intermediate beacon signal BCAP,TXOPB, in which it transmits a new value TXOPB for the Transmission Opportunity of a random access to the Quality of Service Stations inside the radio coverage area thereof. A Quality of Service Station which, in the following, can gain radio resources for itself for the time interval of TXOPB in a random access, communicates via the signals RTS, CTS, DATA and ACK by adhering to the maximum, available time interval of TXOPB. After the end of the beacon period in time, the access point AP sends the next beacon signal BCAP,TXOPC, in which it transmits a new value TXOPC for the Transmission Opportunity of a random access for the following beacon period in time to the Quality of Service Stations inside the radio coverage area thereof.

A corresponding procedure is also possible for the radio stations, which establishes the radio connection between remote radio stations and an access point.

Consequently, the Transmission Opportunity for a random access can be controlled in a flexible manner. The length of the Transmission Opportunity can be adapted to the dynamically changing traffic conditions inside the radio network. As a result, in the case of a small number of Quality of Service Stations in a radio coverage area, a high value for the Transmission Opportunity would be purposeful in order to allow large amounts of data to be sent to the Quality of Service Stations, which gain radio resources for itself in the competition. On the other hand, in the case of a plurality of Quality of Service Stations inside a radio coverage area, a too high value for the Transmission Opportunity considerably complicates a random access, so that only a small value for the Transmission Opportunity of all the Quality of Service Stations has a realistic chance of success in a random access.

In accordance with the IEEE 802.11e standard, if there are remote Quality of Service Stations inside a radio-assisted local network, which can only indirectly be in radio contact with an access point via other Quality of Service Stations, therefore, results in different possibilities of having random accesses carried out to the radio resources in the ECDF method. A first possibility is to grant random accesses to the remote Quality of Service Stations only if resources were allocated to the specific Quality of Service Station, inside the radio coverage area of which, the remote Quality of Service Stations are located or the Quality of Service Station could gain radio resources for itself by a random access. This means that remote Quality of Service Stations can only then implement a random access when the specific Quality of Service Station does not regard the radio medium as reserved. The advantage of this procedure is that remote Quality of Service Stations with their random access cannot interfere with any radio signals of other radio stations such as for example the beacon signals of Quality of Service Stations. However, a disadvantage is the fact that the radio resources in this case cannot be used to the optimum. If the constellation of the Quality of Service Stations and the remote Quality of Service Stations of FIG. 1 are taken into consideration, then it is possible that a random access of the Quality of Service Station QSTA4 and the remote Quality of Service Station RQSTA3 can be successful at the same time because the two radio stations are far from one another and in this way their radio signals are not disturbed.

Figure 8:
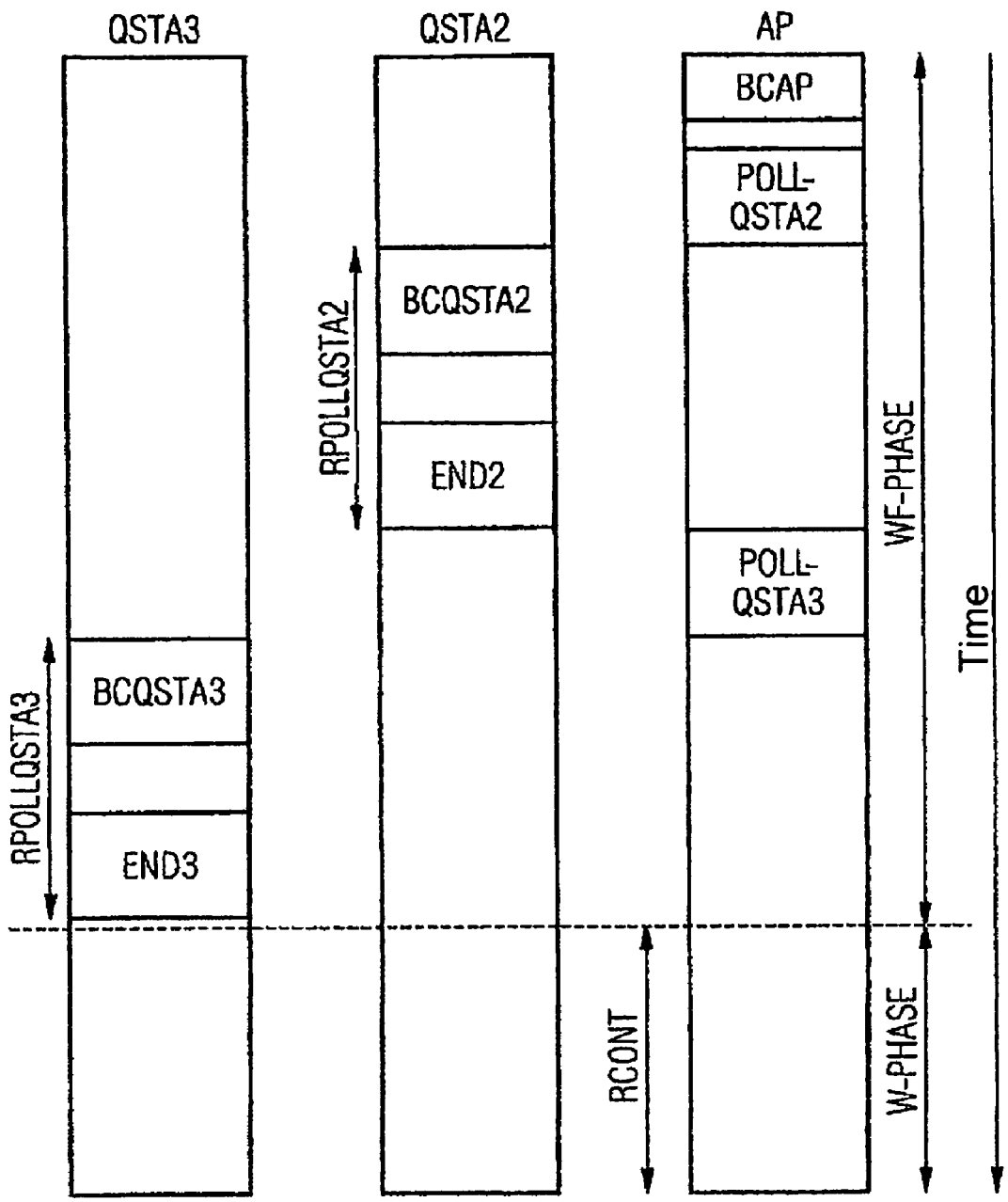
FIG. 8 is a data transmission diagram for a method according to the invention for the distribution of resources if remote Quality of Service Stations by using a common competition phase are available.

Therefore, according to the invention a time interval is introduced during which all the radio stations of the radio-assisted local network may carry a random access, i.e. a common competition phase. FIG. 8 shows such a distribution in time in a phase without competition and in a common competition phase. At the start, the access point AP sends a beacon signal BCAP, which transmits the Quality of Service Stations QSTA1, QSTA2, QSTA3 and QSTA4 inside the radio coverage area thereof, amongst others, the length of the Transmission Opportunity for random accesses within the following beacon period in time. As a result, the access point AP allocates radio resources of the time interval RPOLLQSTA2 with the signal POLLQSTA2 to the Quality of Service Station QSTA2. The Quality of Service Station QSTA2 sends at the start of the time interval RPOLLQSTA2, a beacon signal BCQSTA2, in which it transmits the length of the Transmission Opportunity for random accesses to the remote Quality of Service Station RQSTA3. During the time interval RPOLLQSTA2, the Quality of Service Station QSTA2 can either allocate radio resources to the remote Quality of Service Station RQSTA3 or allow these to access the resources per random access. The Quality of Service Station QSTA2 sends a signal END2 at the end of the time interval RPOLLQSTA2. This signal indicates to the remote Quality of Service Station RQSTA3 inside the radio coverage area thereof that a random access will not be granted in future. This signal END2 can for example consist of an allocation of radio resources to a radio station other than the remote Quality of Service Station RQSTA3, or a signal, which indicates a successful random access of a station other than the remote Quality of Service Station RQSTA3. In addition, the signal END2 can consist of an intermediate beacon signal of the Quality of Service Station QSTA2, which sets the Transmission Opportunity for random accesses at zero. In each of the three cases, which have been described, it is not possible for the remote Quality of Service Station RQSTA3 to implement a random access in future—at least for a specific time interval. However, the sending of the signal END2 of the Quality of Service Station QSTA2 can also be dropped, however, in this case there is the danger that random accesses of the remote Quality of Service Station RQSTA3 collide with the signals of other radio stations.

Subsequent to the time interval RPOLLQSTA2, radio resources are allocated via the access point AP to the Quality of Service Station QSTA3 by the signal POLLQSTA3 for the time interval RPOLLQSTA3. For the signals BCQSTA3 and END3 sent within the time interval RPOLLQSTA3 from the Quality of Service Station QSTA3, the above-mentioned embodiments accordingly apply with regard to the Quality of Service Station QSTA2.

The time interval of the allocations of radio resources to the Quality of Service Stations by the access point AP, represents the phase without competition WF-PHASE. Within this phase without competition WF-PHASE, the Quality of Service Stations QSTA1, QSTA2, QSTA3 and QSTA4 may not implement a random access. On the other hand, the remote Quality of Service Stations RQSTA1, RQSTA2 and RQSTA3 may only implement a random access if radio resources were allocated to the specific Quality of Service Station QSTA2 or QSTA3 and the stations enable a random access of their remote Quality of Service Stations RQSTA1 and RQSTA2 or RQSTA3 to be granted. At the end of the phase without competition WF-PHASE, the access point can be a message which indicates the end of the phase without competition WF-PHASE.

The phase without competition WF-PHASE connects itself to the phase without competition W-PHASE with the length RCONT. During the phase without competition W-PHASE, all the radio stations may implement random accesses. For this purpose, the radio stations must be informed when the competition phase W-PHASE starts and how long it will last. The access point AP, can transmit this information to the Quality of Service Stations QSTA1, QSTA2, QSTA3 and QSTA4 by using a signal sent by it such as, for example, the beacon signal BCAP or the signals POLLQSTA2, POLLQSTA3. Likewise, the specific Quality of Service Station QSTA2 or QSTA3 send this information for example via the signals BCQSTA2 or BCQSTA3 or END2 or END3 to the relevant remote Quality of Service Stations RQSTA1 and RQSTA2 or RQSTA3. The Quality of Service Stations, which have to transmit the information from their remote Quality of Service Stations, may take this information directly from the signals of the access point.

FIG. 9 shows the structure of a MAC frame MAC-FRAME for the IEEE 802.11e standard. The numbers in the top row represent the number of bit octets, i.e. bytes, which are available for the specific field in the bottom row. The first field FRAME CONTROL is used for a plurality of purposes. This for example includes the protocol version, the frame type, information about the fragmentation, encryption information and bits which specify the meaning of the four address fields. The following DURATION ID field, for example, includes information about the virtual reservation mechanism by using RTS and CTS messages and about the engagement period in time of the radio medium. The four address fields ADDRESS 1, ADDRESS 2, ADDRESS 3 and ADDRESS 4 include IEEE 802.11e MAC addresses such as sending, receiving and network addresses in the same way as they are also known in other IEEE 802.x networks. The interpretation of the addresses depends on the values of the frame control. The field with the sequence control number SEQUENCE CONTROL is used in order to be able to identify frames unambiguously. The following field QoS CONTROL contains the relevant QoS parameter. The data field DATA with a length of n bytes can contain any amount of data which is transported from the sender to the receiver or the receivers. The field CRC of the checksum forms the conclusion in order to protect the frame in the same way as is also used in other 802.x networks.

FIG. 10 shows the structure of the DURATION ID field. The first column shows possible meanings of the bits 0 to 13 and the second or third columns the values of bits 14 or 15. The application of the relevant bit combinations must be taken from the right column. The bit combinations shown in rows 2, 3 and 6 are engaged with information in accordance with the IEEE 802.11e standard, while the bit combinations shown in rows 5 and 7 have been reserved. The bit combinations of the fourth row can be used in order to indicate the position and the length of the competition phase W-PHASE.

Therefore, both the Quality of Service Stations and the remote Quality of Service Stations can deduce from a corresponding engagement of the field DURATION ID when and how long a common competition phase is provided for all the radio stations. The common competition phase for all the radio stations results in an effective utilization of the scarce resources should remote Quality of Service Stations be available in a radio-assisted local network.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for regulating random accesses in a radio-assisted local network serving radio stations located in a radio coverage area of at least one access point in the radio-assisted local network, at least one remote radio station located outside the radio coverage area of the at least one access point and inside the radio coverage area of a reachable radio station within the radio coverage area of the at least one access point, comprising:
   temporarily allocating, by the at least one access point, radio resources for sending information, to the radio stations inside the radio coverage area thereof,
   the radio stations temporarily performing a random access to the radio resources for sending information;
   sending a signal, from the reachable radio station to the at least one remote radio station, containing information about a feasibility to accept the random access by the at least one remote radio station of the radio resources for sending information, without allocating radio resources; and
   rejecting the random access of the at least one remote radio station based on the signal.

2. A method according to claim 1, wherein said rejecting of the random access of the at least one remote radio station lasts for a specific time interval.

3. A method according to claim 2, wherein the signal includes an allocation of radio resources to the reachable radio station.

4. A method according to claim 2, wherein the signal indicates availability of the radio resources for the reachable radio station, after a successful random access.

5. A method according to claim 4, wherein the signal indicates sending of information to the reachable radio station.

6. A method according to claim 2, wherein the signal includes a stipulation that a maximum time interval to be used for a random access has to be zero.

7. A method according to claim 6, wherein the signal is a beacon signal.

8. A method according to claim 1, further comprising sending, after said sending of the signal rejecting the random access of the at least one remote radio station, an additional signal from the reachable radio station to the at least one remote radio station which allows a random access of the at least one remote radio station.

9. A method according to claim 8, wherein the additional signal indicates the end of an occupation of radio resources.

10. A method according to claim 8, wherein the additional signal includes a stipulation of a maximum time interval for random access having a value larger than zero.

11. A method according to claim 10, wherein the maximum time interval for random access depends on a number of remote radio stations located outside the radio coverage area of the at least one access point and inside the radio coverage area of the reachable radio station.

12. A method according to claim 11, wherein the additional signal is a beacon signal.

13. A method according to claim 8, wherein the additional signal includes information about a first time interval, which can be used by all the radio stations of the radio-assisted local network for a random access to the radio resources.

14. A method according to claim 13, wherein the information is at least one of a length of the first time interval which can be used by all the radio stations of the radio-assisted local network for the random access to the radio resources and a starting point of the first time interval.

15. A method according to claim 14, wherein outside the first time interval only the at least one access point allocates the radio resources to the radio stations inside the radio coverage area thereof.

16. A method according to claim 15, wherein the information is in the Duration-ID-Field of a MAC frame.

17. A method according to claim 16, wherein the additional signal can be one of a beacon signal, an allocation signal for allocation of the radio resources, and an available signal, which indicates availability of the radio resources after a successful random access has been implemented.

18. A method according to claim 8, wherein the signal and the additional signal are sent from the reachable radio station during a second time interval, in which radio resources of the at least one access point have been allocated to the reachable radio station or in which radio resources are made available to the reachable radio station after a successful random access.

* * * * *

UNITED STATES PATENT AND TRADEMARK OFFICE
CERTIFICATE OF CORRECTION

| | |
|---|---|
| PATENT NO. | : 8,107,424 B2 |
| APPLICATION NO. | : 10/556779 |
| DATED | : January 31, 2012 |
| INVENTOR(S) | : Li et al. |

It is certified that error appears in the above-identified patent and that said Letters Patent is hereby corrected as shown below:

First Page Column 1, Item (54) (Title), Delete "METHOD FOR AN RANDOM ACCESSES IN A LOCAL NETWORK" and insert -- METHOD FOR RANDOM ACCESSES IN A LOCAL NETWORK" --, therefor.

First Page Column 1, Item (75) (Inventors), Line 2, Delete "Jarkarta" and insert -- Jakarta --, therefor.

Column 1, Line 8, Delete "03010325.6" and insert -- 03010625.6 --, therefor.

Signed and Sealed this
Fifteenth Day of May, 2012

David J. Kappos
*Director of the United States Patent and Trademark Office*

UNITED STATES PATENT AND TRADEMARK OFFICE
CERTIFICATE OF CORRECTION

PATENT NO.         : 8,107,424 B2                               Page 1 of 1
APPLICATION NO.    : 10/556779
DATED              : January 31, 2012
INVENTOR(S)        : Li et al.

It is certified that error appears in the above-identified patent and that said Letters Patent is hereby corrected as shown below:

Title Page, Item (54) and at Column 1, lines 1 and 2, (Title), Delete "METHOD FOR AN RANDOM ACCESSES IN A LOCAL NETWORK" and insert -- METHOD FOR RANDOM ACCESSES IN A LOCAL NETWORK --, therefor.

Title Page, Item (75) (Inventors), Line 2, Delete "Jarkarta" and insert -- Jakarta --, therefor.

Column 1, Line 8, Delete "03010325.6" and insert -- 03010625.6 --, therefor.

This certificate supersedes the Certificate of Correction issued May 15, 2012.

Signed and Sealed this
Nineteenth Day of June, 2012

David J. Kappos
*Director of the United States Patent and Trademark Office*